United States Patent

[11] 3,580,646

| [72] | Inventor | George E. Ternent<br>Elyria, Ohio |
|---|---|---|
| [21] | Appl. No. | 858,702 |
| [22] | Filed | Sept. 17, 1969 |
| [45] | Patented | May 25, 1971 |
| [73] | Assignee | Bendix-Westinghouse Automotive Air<br>Brake Company<br>Elyria, Ohio |

[54] DUAL CIRCUIT BRAKE VALVE
7 Claims, 1 Drawing Fig.

[52] U.S. Cl. ................................................. 303/52,
137/627.5, 303/54
[51] Int. Cl. ..................................................... B60t 15/02
[50] Field of Search .......................................... 137/627.5;
303/52, 53, 54

[56] References Cited
UNITED STATES PATENTS

| 3,355,223 | 11/1967 | Klimek | 303/52 |
| 3,359,043 | 12/1967 | Papin | 303/52 |
| 3,390,920 | 7/1968 | Dobrikin | 303/52 |
| 3,416,843 | 12/1968 | Kobnick | 303/54 |

Primary Examiner—Milton Buchler
Assistant Examiner—John J. McLaughlin
Attorney—Scrivener, Parker, Scrivener and Clarke ABSTRACT: A dual circuit brake valve including first and second self-lapping valve elements for respectively controlling primary and secondary fluid pressure braking circuits, the first valve element being manually controlled and the second valve element being controlled by a relay piston subject to the pressure in the primary circuit wherein the relay piston is subjected to the action of a pair of springs acting in opposite directions so that during operation of the first valve element the crack pressure required to open the second valve element is reduced to a minimum and the application of fluid pressure to the primary and secondary circuits is substantially simultaneous.

PATENTED MAY 25 1971  3,580,646
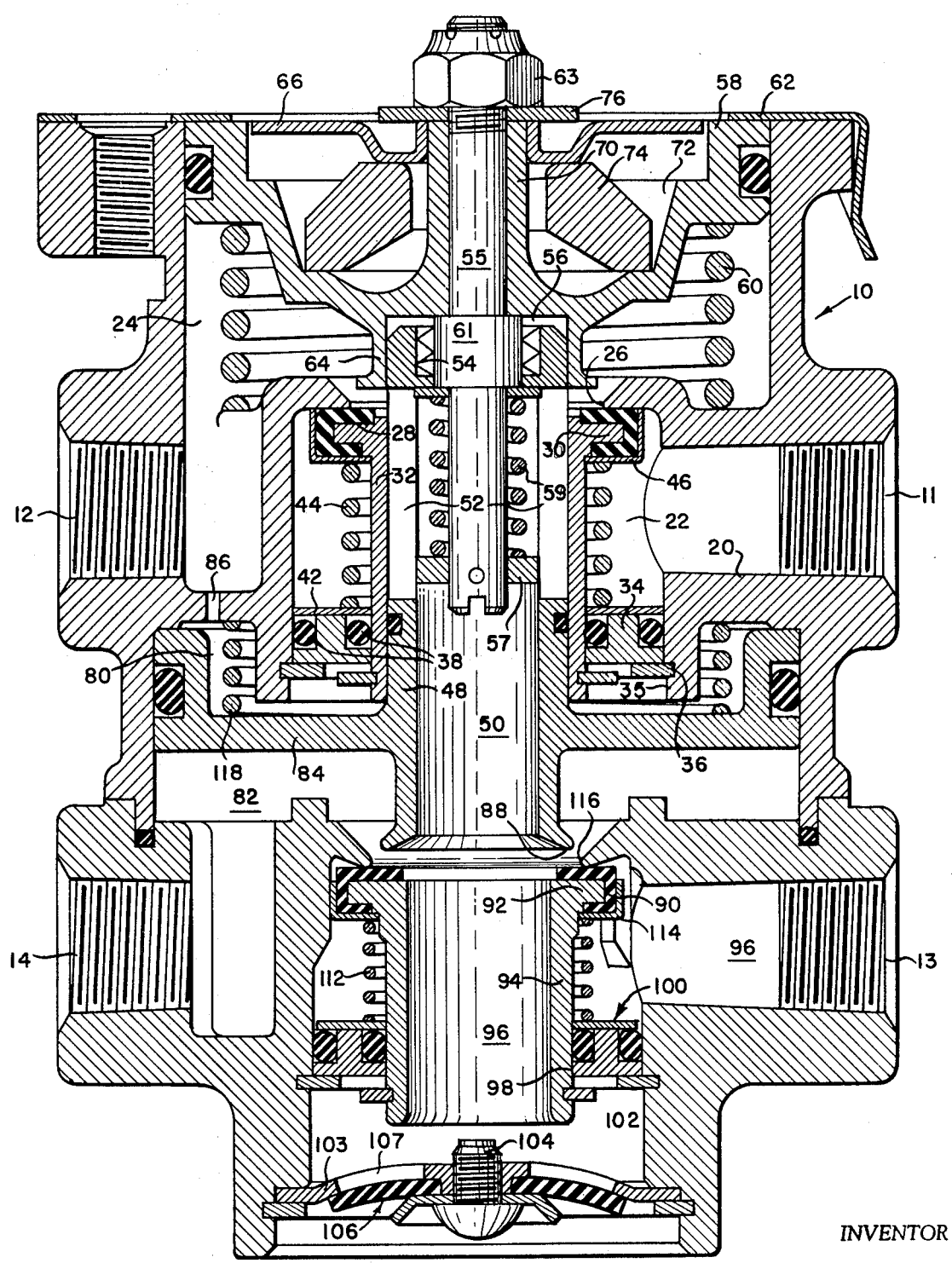
INVENTOR
GEORGE E. TERNENT
BY
Scrivener Parker Scrivener & Clarke
ATTORNEYS

DUAL CIRCUIT BRAKE VALVE

It has heretofore been proposed to utilize dual brake valves for separate primary and secondary vehicle braking systems, and such valves have included a pair of valve elements controlled by the operator. An undesirable feature of the prior dual brake valves has been the relatively high crack open force necessary to open the valve element controlling the secondary system, such force being due to the various return springs of the brake valve as well as the frictional forces of the moving parts of the valve. A further disadvantage was the inherent sequential operation of the secondary system and the resultant pressure differential between the primary and secondary systems.

One of the prime objects of the present invention is to provide a novel dual brake valve which is so constructed and arranged as to materially decrease the crack open force required to open the control valve for the secondary system, thereby overcoming the foregoing disadvantages.

Another object of the invention is to provide a dual brake valve construction which includes a novel arrangement of springs associated with the valve parts which are so arranged that during actuation of the valve, sequential operation of the valve elements controlling the primary and secondary systems is eliminated for all practical purposes and substantially uniform pressures are delivered to the respective systems.

Other objects and novel features of the invention will appear more fully hereinafter from a consideration of the following detailed description when taken in connection with the accompanying drawing, the single FIGURE of which is a vertical cross-sectional view of a dual brake valve embodying the features of the invention.

In the drawing the numeral 10 designates a valve casing having primary and secondary pairs of inlet and delivery ports 11, 12 and 13, 14. The respective inlet ports 11, 13 are connected to independent fluid pressure supply sources, not shown, and the delivery ports 12, 14 are adapted to be connected to independent brake actuators. The interior of the casing 10 is divided by a wall 20 into upper and lower parts each containing valve elements for controlling the flow of fluid between the respective inlet and delivery ports or between the delivery ports and atmosphere.

With particular reference to the part of the casing above the wall 20, it will be observed that this is divided into an inlet cavity 22 and a delivery cavity 24 which are separated by a valve seat 26 normally closed by an annular, combined inlet and exhaust valve element 28 received on a radial flange 30 at the upper end of a sleeve 32 slideably received in the central aperture of an annular sealing ring 34 received in a central opening 35 through the wall 20 and which may be of inverted T-shape in cross section and is supported at its bottom edge by a snap ring 36. The stem of the T-shaped sealing ring 34 is bracketed by a pair of O-rings 38 and the upper surface of the stem affords a support for a washer 42 which serves as an abutment for the lower end of a spring 44 whose upper end is in engagement with a metallic valve support member 46 to urge the valve 28 to its closed position in sealing engagement with the valve seat 26.

The valve sleeve 32 slideably receives an exhaust plunger 48 having a vertical exhaust passage 50 therein whose upper end is normally connected to the delivery cavity 24 through a series of slots 52 formed in the sidewall of the plunger 48. The head 54 of the plunger is slidably received in a recess 56 formed in the underside of a graduating piston 58 slidably received in the delivery cavity 24 and normally urged to the position of the drawing by a graduating spring 60 interposed between the floor of cavity 24 and the lower surface of the piston. A stop plate 62 limits the upward movement of the piston.

A clearance exists between the top of the recess 56 and the upper edge of the head 54 of the exhaust plunger and surrounding the recess is a skirt 64 forming an exhaust valve seat, which upon downward movement of the piston is adapted to sealingly engage the inner annular part of the inlet valve element 28 thus disconnecting the delivery cavity 24 from the exhaust passage 50 in the plunger 48. Continued downward movement of the piston unseats valve element 28 thereby connecting the inlet cavity 22 to the delivery cavity 24 so that fluid flows to the brake actuators by way of delivery port 12.

As shown, a rod 55 projects through the piston 58 and at its lower end is provided with a fixed disc 57 slidably received within the bore of the exhaust passage 50, a precompressed spring 59 being confined between the disc 57 and the head 54. Intermediate its ends, the rod is provided with an enlarged collar 61 which is slidable with respect to the head 54 and is maintained in the position illustrated by means of a nut 63.

Movement of the piston 58 to effect closing of the exhaust passage and opening of the inlet valve is effected by a conventional brake pedal (not shown) which has a part bearing on an enlarged disc 66 slidably received on an upstanding neck part 70 of the piston 58. Received in a recess 72 on the upper side of the piston is a rubber graduating spring 74 of a somewhat frustoconical configuration which bears against the lower surface of the recess 72 and also against the underside of the disc 66 to urge the latter upwardly into engagement with a washer 76 fixed to the neck part 70 by the nut 63. For a complete description of a suitable pedal arrangement and the structure, mode of operation and advantages of the rubber graduating spring 74, reference is made to the U.S. Pat. No. 3,003,825 to Herbert A. Kemble, dated Oct. 10, 1961, it being sufficient to say here that when the brake pedal is depressed the disc 66 tends to compress spring 74 which in turn moves the piston 58 downwardly against the spring 60 until the exhaust valve seat 64 is closed and the inlet valve 28 is opened whereupon the pressure admitted to cavity 24 acts on the lower side of the piston and this pressure force coupled with the force of spring 60 causes the piston to move upwardly to further compress spring 74 until the inlet and exhaust valve parts are lapped as previously described. Downward or upward movement of the pedal increases or relieves the pressure in the cavity in a manner well recognized by those skilled in the art and further description of this action is not deemed necessary.

Referring now to the part of the valve casing below the dividing wall 20, the numeral 80 designates a relay cavity which is separated from a second inlet cavity 82 by an enlarged relay piston 84 which is integrally connected to and has extending centrally therethrough the lower end of the aforementioned exhaust plunger 48. It will be noted that a fluid passage 86 through the dividing wall 20 serves to connect the delivery cavity 24 of the upper part of the casing with the relay cavity 80 so that when fluid under pressure is received in cavity 24 this same pressure is exerted on the upper side of the relay piston 84 tending to cause the exhaust plunger 48 to move downwardly until the lower edge 88 of the exhaust plunger engages the inner annular part of a second combined inlet and exhaust valve 90 which is received on an annular flange 92 of a second exhaust plunger 94 having an exhaust passage 96 therethrough registering with the exhaust passage 50 in the upper plunger 48. It will be noted that the second exhaust plunger 94 extends through a second inlet cavity 96 connected to the aforementioned inlet port 13. The exhaust plunger 94 is slidably received in an aperture 98 through a seal member 100 which is retained in position by a spring clip 102. Fixed in the casing below the passage 96 is the annular edge of a somewhat spherical shaped, perforated metallic member 103 which is centrally apertured to receive a part 104 of a one-way dust valve or guard 106 of rubbery material which permits exhaust fluid to escape to atmosphere through the perforations 107 of member 103 while preventing the ingress of dust and dirt. A valve return spring 112 interposed between the upper surface of the seal member 100 and a metallic valve support 114 serves to retain the valve member 90 normally closed against a valve seat 116 between the inlet and delivery cavities 96, 82. As shown a relay piston application spring 118 is interposed between the upper surface of the relay piston 84 and the lower surface of the wall 20, such spring constantly tending to move the piston 84 in a downward direction tending to open the valve 90 which controls the flow of fluid to the secondary braking system.

The feature of the present invention resides in the selection of the loading of the springs 60, 59, 118 and 112 such that the crack pressure force required to open the lower inlet valve 90 is reduced to a minimum, thereby ensuring the application of substantial equal pressures to the primary and secondary systems without the sequential operation inherent in dual brake valves heretofore proposed.

In one arrangement, which has been found to be highly effective in practice and in order to achieve the above mentioned desirable results, the graduating spring 60 has an assembled height load value of approximately 40 pounds while the relay piston return spring 59 has a load value of about 21 pounds. The relay piston application spring 118, on the other hand, has an approximate load value of 18 pounds while the lower inlet valve return spring 112 has a load value of about 12 pounds. From the foregoing, it will be seen that spring 59 has a higher load value than spring 118 and since spring 60 has a still higher load value, the brake valve in the release position will assume the position shown in the drawing.

With the parts in the position shown, it will be understood that the spring 59 which is confined between the head 54 and the disc 57, will maintain the relay piston 84 against the lower surface of the wall 20 so that the exhaust valve formed by the edge 88 is spaced above the inlet valve 90 as illustrated. Application of manual force to the disc 66 will now effect downward movement of the graduating piston 58 and the relay piston 84 in unison until the relay exhaust valve 88 closes upon the inlet valve 90. When this occurs, the graduating piston 58 may move a short additional distance as determined by the space existing between the lower end of the neck part 70 and the upper end of the head 54 and during this additional travel of the piston 58 the spring 59 is collapsed, thus relieving its load from the relay piston 84. Now the full force of the spring 118 is transferred to the lower inlet valve 90. The latter valve however, is held in its closed position by the spring 112, which has a load of about 12 pounds, plus the supply pressure acting on the differential area of the inlet valve which amounts to approximately 24 pounds or a total inlet valve closing force of about 36 pounds. This 36 pounds less the 18 pounds of the spring 118 leaves an approximate net 18 pound inlet valve closing force. It now follows that when the upper inlet valve 28 is opened to admit fluid pressure to the primary circuit, by way of inlet cavity 22, outlet cavity 24 and outlet port 12, delivery pressure will be admitted to the relay cavity 80 through the passage 86 to cause movement of the relay piston 84 to cause the cracking of the inlet valve 90. However, due to the decreased closing force on the valve 90, the required pressure on the relay piston 84 will be very slight.

While the spring forces above mentioned have given highly desirable results in practice, it will be understood that such forces may be varied in order to achieve the results desired, that is, a material reduction in the crack force required to open the inlet valve controlling the secondary circuit.

It will be understood that in the event of failure of the fluid pressure in the primary circuit, the secondary circuit may nevertheless be energized since it will only be necessary to manually move the piston 58 and exhaust member 48 downwardly to open the secondary inlet valve 90.

From the foregoing it will be appreciated that the arrangement of the springs 59 and 118 and the operation thereof materially reduces the crack force required to open the secondary inlet valve 90, thus avoiding the sequential valve operation inherent in the prior valves and ensuring uniform pressures in the primary and secondary circuits.

What I claim is:

1. In a dual circuit brake valve having a housing including first and second sets of inlet and delivery ports, first and second normally closed valve members for controlling communication between the respective inlet and delivery ports, manual valve actuating means for moving the first valve member to open position, second valve actuating means for moving said second valve member to open position, a fluid responsive relay member connected to said second valve actuating means and movable therewith, and fluid passage means communicating said first delivery port with said fluid responsive relay member, the invention which comprises a first spring acting on said relay member and constantly tending to move the latter and the second valve actuating means in a direction to open said second valve member, and a second spring arranged between said manual valve actuating means and said second valve actuating means and acting in opposition to said first spring to apply a preloading force on the second valve actuating means to maintain the latter spaced from said second valve member, said second spring constructed and arranged such that the manual and second valve actuating means move in unison until the second valve actuating means engages the second valve member, additional movement of said manual valve actuating means effecting the opening of said first valve member and the removal of said preload force from said second valve actuating means so that the second valve member is opened by movement of the relay member and second valve actuating member in response to the action of said first spring and the fluid pressure supplied through said fluid passage means.

2. The dual brake valve construction of claim 1 wherein the second spring exerts a greater force than said first spring.

3. The dual brake valve construction of claim 2 wherein the second valve actuating means is of tubular construction and provided with a head at its upper end, and a rod fixed to said manual valve actuating means and having a part extending downwardly into the second valve actuating member, said second spring being confined between the lower end of said part and said head.

4. The dual brake valve construction of claim 3 wherein said head is received within a recess provided in the lower portion of said manual valve actuating member.

5. The dual brake valve construction of claim 4 wherein said rod is provided with an enlarged collar positioned in said recess and said head surrounds said collar.

6. The dual brake valve construction of claim 5 wherein said second spring is confined between the lower end of said part at one end and the head and collar at the other.

7. The dual brake valve construction of claim 6 wherein the upper surface of said head is normally spaced from the upper end of said recess to afford a lost motion between the manual valve actuating means and said head.